US009141429B2

(12) United States Patent
Yamauchi et al.

(10) Patent No.: US 9,141,429 B2
(45) Date of Patent: Sep. 22, 2015

(54) MULTICORE PROCESSOR SYSTEM, COMPUTER PRODUCT, AND CONTROL METHOD

(71) Applicant: FUJITSU LIMITED, Kawasaki-shi, Kanagawa (JP)

(72) Inventors: Hiromasa Yamauchi, Kawasaki (JE); Koichiro Yamashita, Hachioji (JP); Kiyoshi Miyazaki, Machida (JP); Hitoshi Ikeda, Saitama (JP)

(73) Assignee: FUJITSU LIMITED, Kawasaki (JP)

( * ) Notice: Subject to any disclaimer, the term of this patent is extended or adjusted under 35 U.S.C. 154(b) by 397 days.

(21) Appl. No.: 13/624,353

(22) Filed: Sep. 21, 2012

(65) Prior Publication Data

US 2013/0024588 A1    Jan. 24, 2013

Related U.S. Application Data

(63) Continuation of application No. PCT/JP2010/055287, filed on Mar. 25, 2010.

(51) Int. Cl.
G06F 9/50 (2006.01)
G06F 13/14 (2006.01)
G06F 13/16 (2006.01)
G06F 13/362 (2006.01)

(52) U.S. Cl.
CPC .......... G06F 9/5027 (2013.01); G06F 13/1605 (2013.01); G06F 13/362 (2013.01); G06F 2209/5021 (2013.01)

(58) Field of Classification Search
CPC . G06F 13/1605; G06F 13/362; G06F 13/364; G06F 9/5027
USPC .................................................. 710/113, 240
See application file for complete search history.

(56) References Cited

U.S. PATENT DOCUMENTS 7,133,950 B2 * 11/2006 Olukotun ...................... 710/240
2006/0123420 A1    6/2006 Nishikawa

FOREIGN PATENT DOCUMENTS

| EP | 1 544 737   | 6/2005 |
| JP | 2-143363    | 6/1990 |
| JP | 5-165760    | 7/1993 |
| JP | 2008-158687 | 7/2008 |
| JP | 2008-217825 | 9/2008 |

OTHER PUBLICATIONS

International Search Report of Corresponding PCT Application PCT/JP2010/055287 mailed Jul. 6, 2010.
Hironori Kasahara, "Parallel Processing Technology", Corona Publishing Co., Ltd., 1991, pp. 130-131, 198.
Japanese International Preliminary Report on Patentability for PCT/JP2010/055287 (11 pages).
Extended European Search Report dated Jul. 30, 2015 in corresponding European Patent Application No. 10848404.9.

* cited by examiner

Primary Examiner — Glenn A Auve
(74) Attorney, Agent, or Firm — Staas & Halsey LLP

(57) ABSTRACT

A multicore processor system includes a core configured to detect a change in a state of assignment of a multicore processor; obtain, upon detecting the change in the state of assignment, number of accesses of a common resource shared by the multicore processor by each of process that are assigned to cores of the multicore processor; calculate an access ratio based on the obtained number of accesses; and notify an arbitration circuit of the calculated access ratio, the arbitration circuit arbitrating accesses of the common resource by the multicore processor.

11 Claims, 13 Drawing Sheets

FIG.2

| PROCESS 201 | GRANULARITY 202 | PRIORITY 203 | NUMBER OF ACCESSES/ ITERATIONS 204 | BUS ACCESS FREQUENCY 205 / 123 |
|---|---|---|---|---|
| PROCESS A | COARSE-GRANULARITY PROCESS | LOW | 2000 | 0.00005 |
| PROCESS A-1 | COARSE-GRANULARITY PROCESS | LOW | 1000 | 0.0002 |
| PROCESS A-1-1 | doacross PROCESS | HIGH | 10000 | 0.0000001 |
| PROCESS A-1-2 | COARSE-GRANULARITY PROCESS | LOW | 1000 | 0.0001 |
| PROCESS A-2 | doall PROCESS | LOW | 1000 | 0.0001 |
| PROCESS B | COARSE-GRANULARITY PROCESS | LOW | 1000 | 0.0001 |
| PROCESS C | COARSE-GRANULARITY PROCESS | LOW | 1000 | 0.0001 |

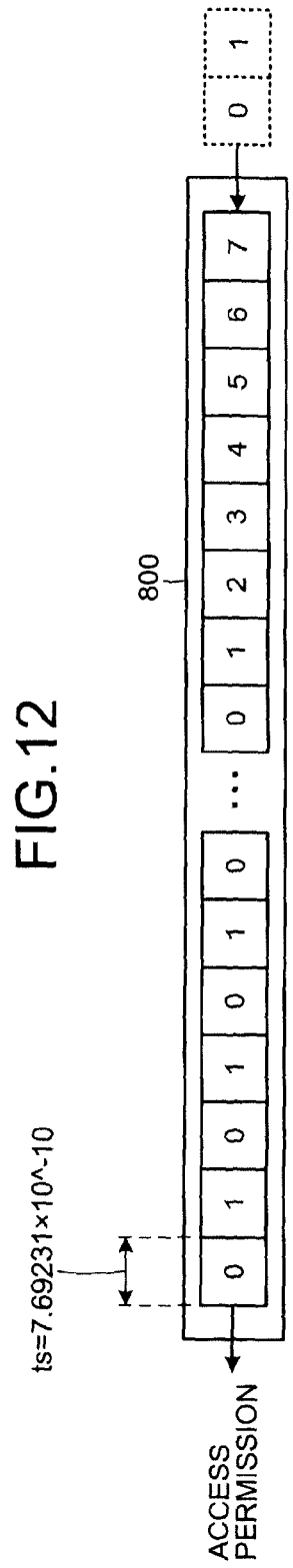

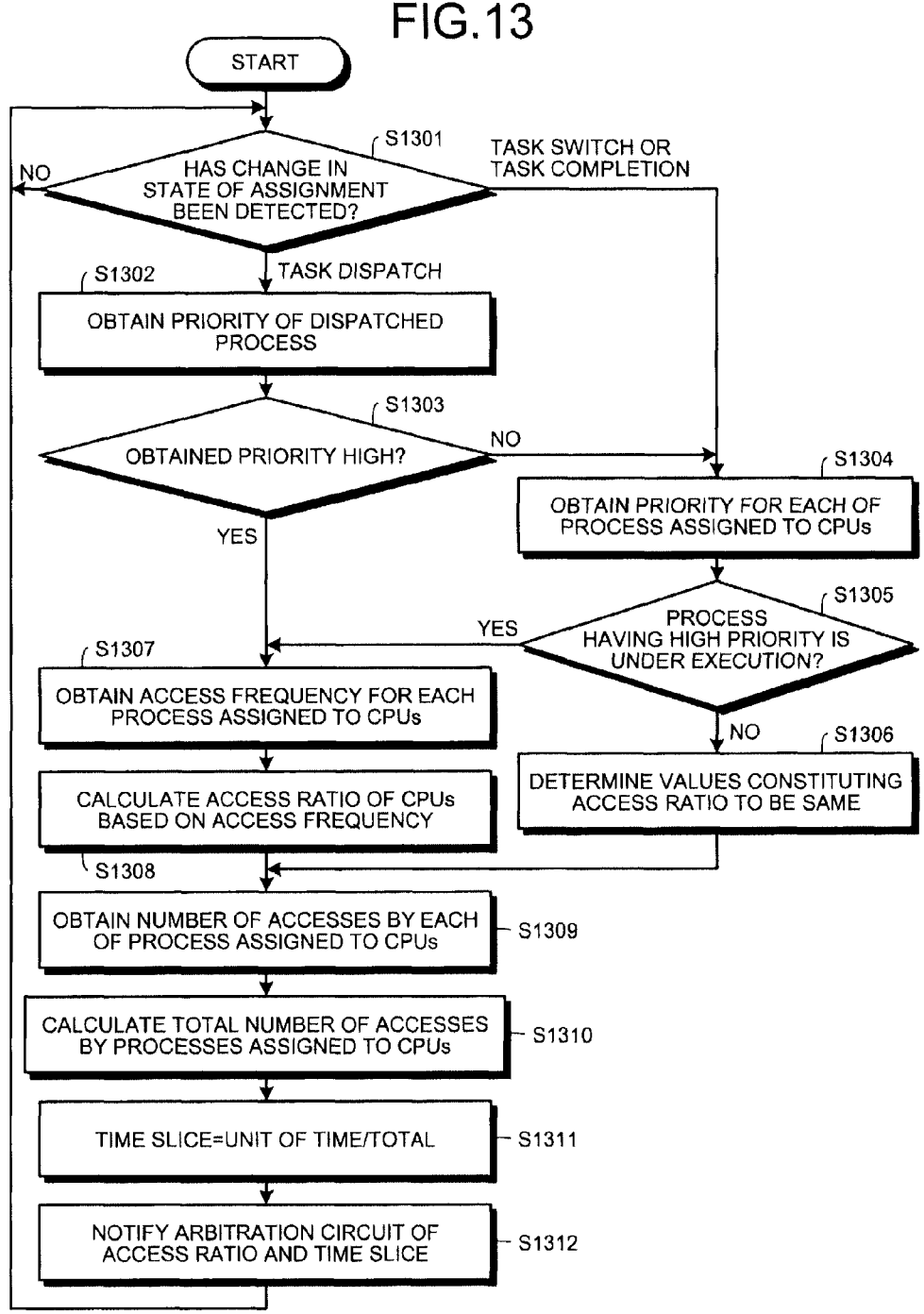

MULTICORE PROCESSOR SYSTEM, COMPUTER PRODUCT, AND CONTROL METHOD

CROSS REFERENCE TO RELATED APPLICATIONS

This application is a continuation application of International Application PCT/JP2010/055287, filed on Mar. 25, 2010 and designating the U.S., the entire contents of which are incorporated herein by reference.

FIELD

The embodiment discussed herein is related to a multicore processor system, a control program, and a control method for controlling an arbitration circuit that arbitrates access of a common resource shared by a multicore processor.

BACKGROUND

In a conventional shared-memory multicore processor system, coherence between caches has to be maintained if one of the central processing units (CPUs) updates shared data on a cache, to enable other CPUs to access the latest data updated from the shared data. Maintaining coherence between caches is called "cache coherency." Snooping is one method for cache coherency.

In the snooping, an update of shared data is detected by monitoring, by a snoop controller, the state of lines of the cache and caches of other CPUs and exchanging information concerning update with the caches of the other CPUs. Upon detection of an update, each cache purges data before the update via a data bus or a snoop bus and caches the updated data via a data bus.

If multiple CPUs in a multicore processor issue access requests to a bus at the same time, an arbitration circuit determines a CPU of which access is permitted according to round robin, whereby a right to access the bus is given to the CPUs sequentially.

The arbitration circuit includes a request buffer, and permits access requests registered in the request buffer sequentially from the top. According to round robin, an access request concerning a process assigned to one CPU and the other CPUs is temporarily suspended when the time (i.e., time slice) allotted to the access request elapses, and input into the end of the request buffer.

A process, which is a unit of processing performed by an application, is classified into two categories, namely, a process representing a function, etc. (hereinafter, "coarse-granularity process") and a process representing a loop process, etc. (hereinafter, "medium-granularity process"). The medium-granularity process is further classified into two categories, namely, a process having no dependency between loop iterations (hereinafter, "doall process") and a process having a dependency between loop iterations (hereinafter, "doacross process") (see, for example, Japanese Patent Publication No. 2008-217825 and Kasahara, Hironori. "Parallel Processing Technology," CORONA PUBLISHING CO., LTD, Jun. 20, 1991, page. 131).

However, if a doacross process is divided into parallel processes and assigned to different CPUs, respectively, snooping has to be executed frequently due to the dependency between iterations, thereby increasing the number of times the bus is used.

On the other hand, if a doall process is divided into parallel processes and assigned to different CPUs, respectively, synchronization is taken at the end of the loop process since calculation can be independently done for each iteration. On the other hand, the coarse-granularity process requires no snooping due to iteration.

Conventionally, since the right to access the bus is given to the CPUs sequentially according to round robin, the doacross process cannot perform snooping via the bus while the doall process or the coarse-granularity process uses the bus, thereby increasing the execution time of the doacross process that frequently accesses the bus.

SUMMARY

According to an aspect of an embodiment, a multicore processor system includes a core configured to detect a change in a state of assignment of a multicore processor; obtain, upon detecting the change in the state of assignment, number of accesses of a common resource shared by the multicore processor by each of process that are assigned to cores of the multicore processor; calculate an access ratio based on the obtained number of accesses; and notify an arbitration circuit of the calculated access ratio, the arbitration circuit arbitrating accesses of the common resource by the multicore processor.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram of an example of a priority table 123;

FIG. 12 is a diagram of a third example of arbitrating accesses based on the notified access ratio; and FIG. 13 is a flowchart of a control performed by the scheduler 111.

DESCRIPTION OF EMBODIMENTS

Preferred embodiments of the present invention will be explained with reference to the accompanying drawings.

A preferred embodiment of a multicore processor system, a control program, and a control method according to the present invention is described in detail below with reference to the accompanying drawings. The multicore processor of the multicore processor system according to the present embodiments is a processor that includes multiple cores.

Provided the multicore processor includes multiple cores, the multicore processor may be a single processor with multiple cores or single-core processors connected in parallel. For simplicity, single-core processors connected in parallel are taken as an example in the present embodiment.

Figure 1:
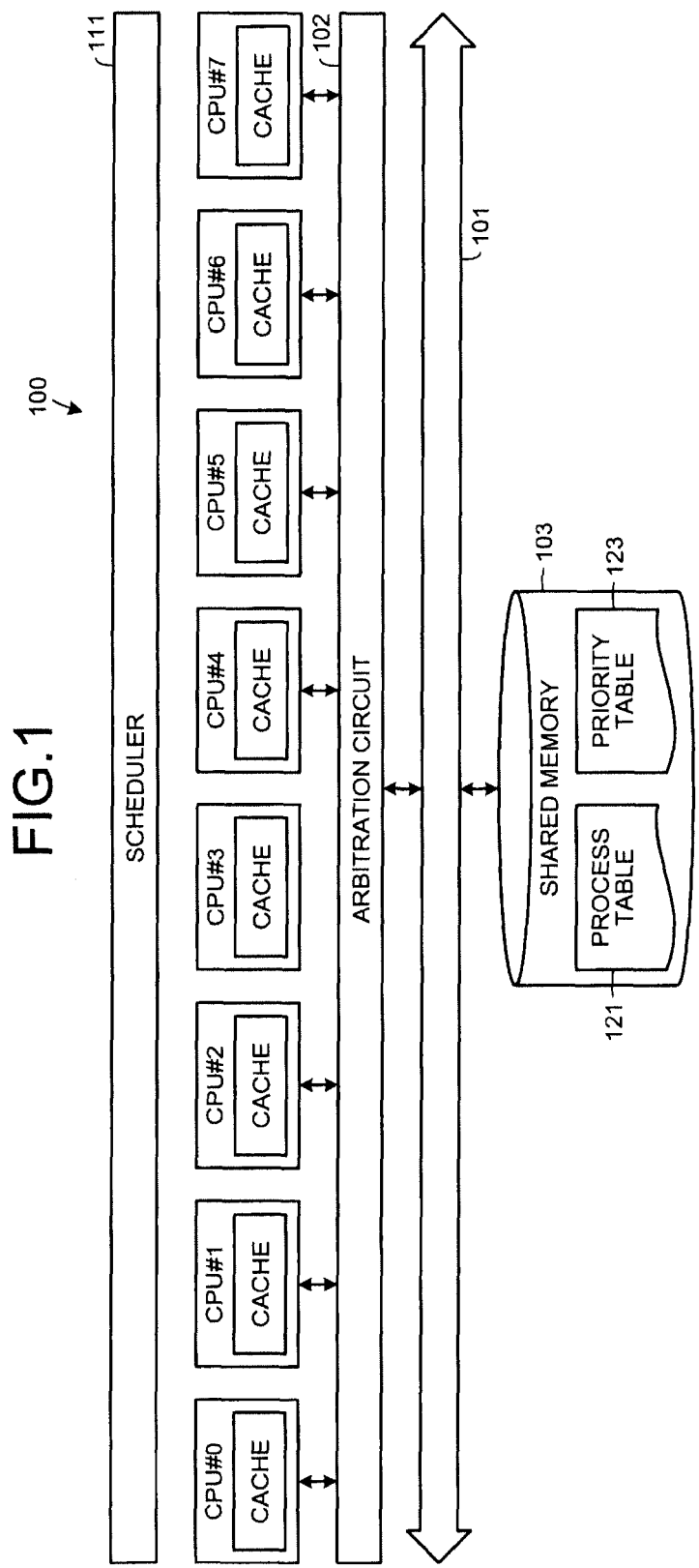
FIG. 1 is a hardware block diagram of a multicore processor system according to an embodiment.

FIG. 1 is a hardware block diagram of a multicore processor system according to the present embodiment. As depicted in FIG. 1, a multicore processor system 100 includes CPUs #0 to #7, a shared memory 103, a bus 101, and an arbitration circuit 102. CPUs #0 to #7 are connected to the bus 101 via the arbitration circuit 102. Components of the multicore processor system 100 other than CPUs #0 to #7 are connected to each other via the bus 101. In the present embodiment, a common resource shared by CPUs #0 to #7 is the bus 101.

CPUs #0 to #7 include registers and caches, respectively. CPU#0 executes the master OS and governs overall control of the multicore processor system 100. The master OS includes a scheduler 111 that controls assignment of application. The scheduler 111 includes a control program that controls the arbitration circuit 102 by determining an access ratio and calculating the time slice. Each of CPUs #1 to #7 executes the slave OS and a process(es) assigned thereto by the scheduler 111.

The arbitration circuit 102 arbitrates accesses of the bus 101 by CPUs #0 to #7 according to the access ratio. For example, the arbitration circuit 102 registers access requests from CPUs #0 to #7 into the request buffer, takes the access requests in the order the access requests have been registered in the request buffer, and permits the access request.

The shared memory 103 is shared by the multicore processor and includes a process table 121, a priority table 123, and a boot program. For example, the shared memory 103 includes a read only memory (ROM), a random access memory (RAM), and a flash ROM.

For example, the ROM stores therein the program. The RAM is used as a work area of CPUs #0 to #7. The program stored in the shared memory 103 is loaded on each CPU, and the process coded therein is executed by each CPU. In the present embodiment, the scheduler 111 includes a control program that controls the arbitration circuit 102, and CPU#0 loads the master OS and executes the process coded therein. Thus, CPU#0 executes the process coded in the control program.

The process table 121 indicates which process is assigned to which CPU and whether each CPU is executing a process concerning the application assigned thereto. As well known, a process is a unit of processing performed by an application. Each CPU reads the process table 121 and stores the process table 121 into the cache thereof. The scheduler 111 assigns a process to any one of CPUs #0 to #7, and registers the CPU to which the process is assigned into the process table 121. When a switching of process (hereinafter, "task switch") occurs, the CPU registers the process of which execution has been started into the process table 121. Upon completion of the process, the CPU deletes information on the process from the process table 121.

After rewriting the process table 121, the process tables 121 stored in the caches of all CPUs are updated by snooping. The scheduler 111 detects a task dispatch, a task switch, or a task completion by referring to the process table 121.

The priority table 123 stores the priority and an access frequency of each process. Each CPU reads the priority table 123 stored in the shared memory 103, and stores the priority table 123 into the cache thereof when the CPU is booted.

FIG. 2 is a diagram of an example of the priority table 123. The priority table 123 indicates the priority and the access frequency of each process, and includes a process field 201, a granularity field 202, a priority field 203, a number of accesses/iterations field 204, and a bus access frequency field 205.

The process field 201 stores the name of each process. An application is divided into multiple processes by a designer of the application or a compiler, and which process(es) is executed is preliminary determined for each application.

The granularity field 202 indicates whether the process stored in the process field 201 is a coarse-granularity process, a doacross process, or a doall process. The granularity of each process is analyzed by a compiler. An example of the granularity of a process is explained with reference to the drawing.

Figure 3:
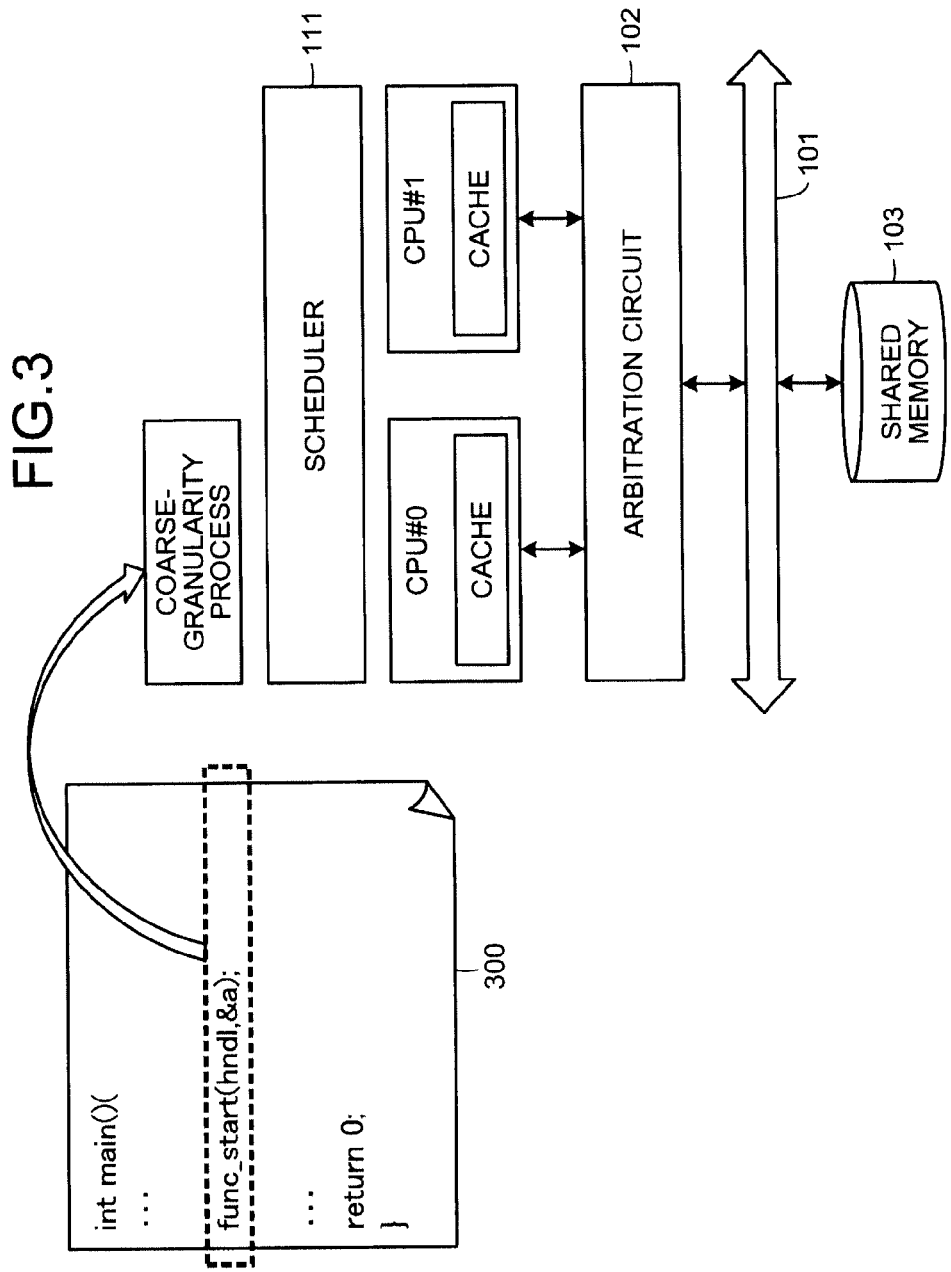
FIG. 3 is a diagram of an example of a coarse-granularity process.

FIG. 3 is a diagram of an example of the coarse-granularity process. CPUs #2 to #7 are omitted in FIG. 3. For example, the coarse-granularity process is a process such as a function Func_start(hndl, &a) in a list 300.

Figure 4:
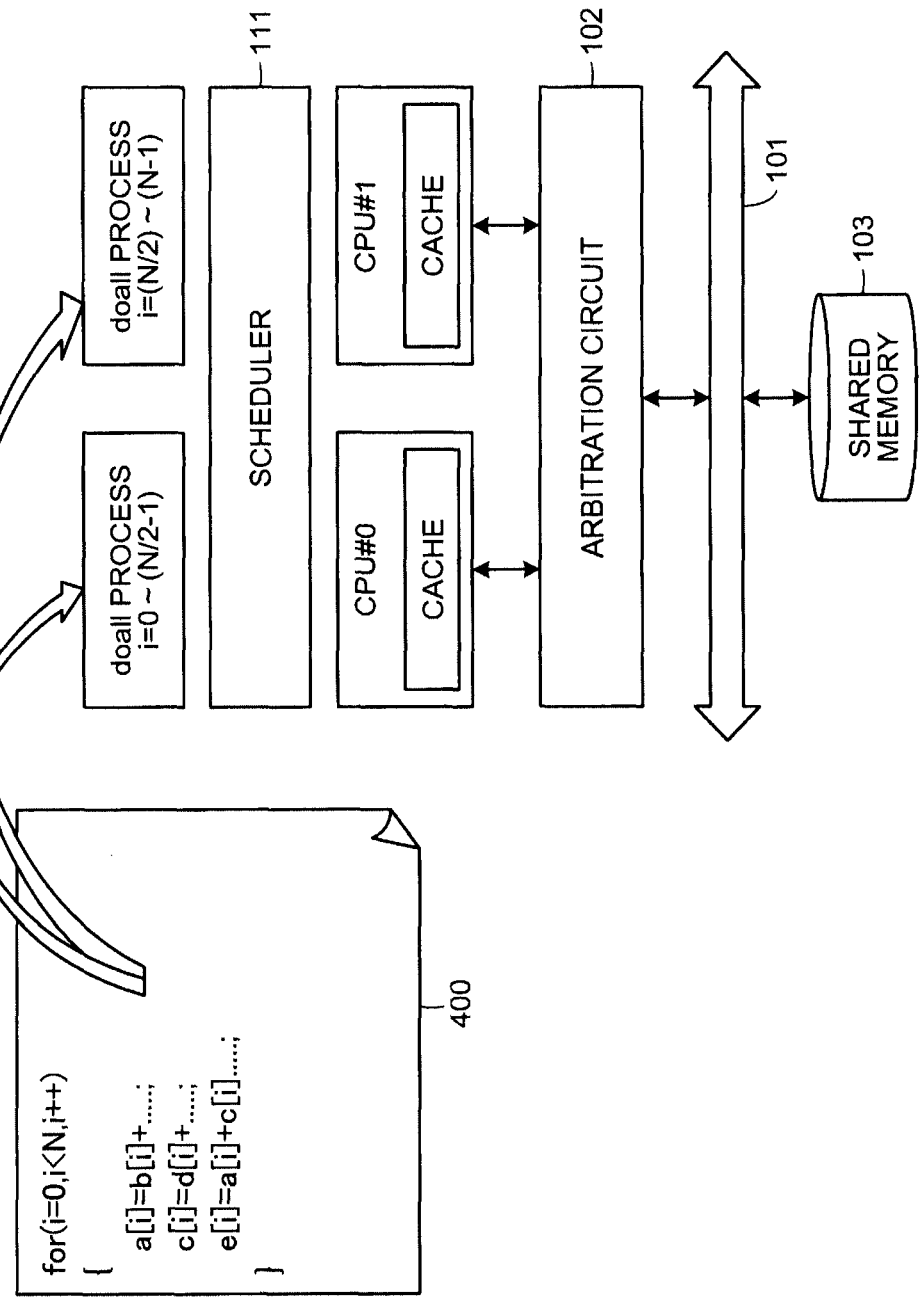
FIG. 4 is a diagram of an example of a doall process.

FIG. 4 is a diagram of an example of the doall process. CPUs #2 to #7 are omitted in FIG. 4. For example, the doall process is a process such as a for statement in a list 400. Only the i-th value of each coefficient is used in one iteration (i) of the for statement in the list 400.

In the example of FIG. 4, processes concerning the for statement in the list 400 are divided into two processes one of which includes iterations 0 to (N/2−1) and the other includes iterations N/2 to (N−1). The processes are synchronized only upon completion of the processes, since there is no dependency between the two processes.

Figure 5:
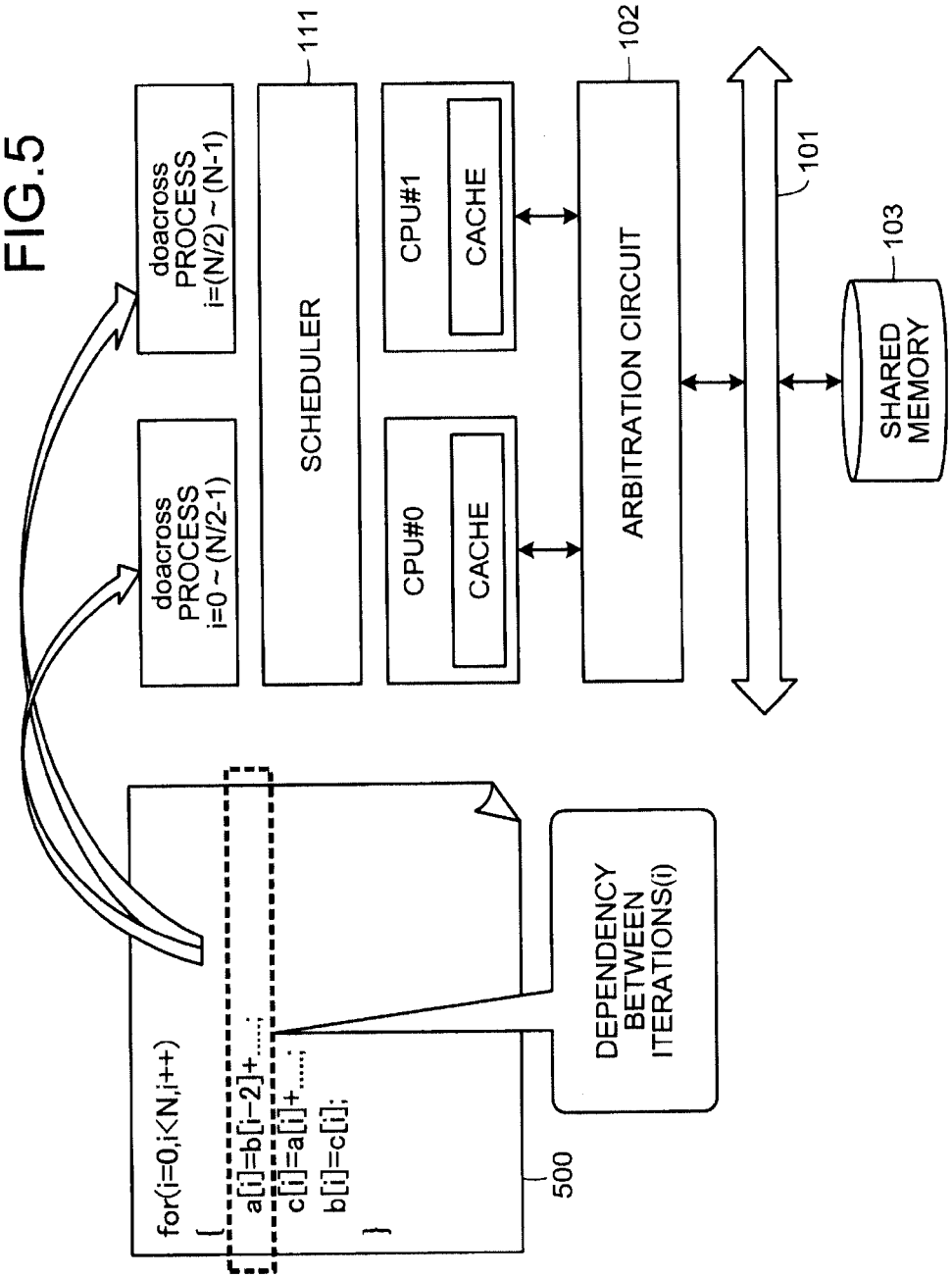
FIG. 5 is a diagram of an example of a doacross process.

FIG. 5 is a diagram of an example of the doacross process. CPUs #2 to #7 are omitted in FIG. 5. For example, the doacross process is a process such as a for statement in a list 500. There is a dependency between iterations (i) of the for statement in the list 500 since b[i−2] is used for calculating a[i]. The dependency between the iterations causes a frequent snooping during the execution of the processes, thereby increasing the number of accesses of the bus 101.

Here, reference of the description returns to FIG. 2; the priority field 203 stores whether the priority is high. "HIGH" indicates the priority is high, while "LOW" indicates the priority is not high. In the present embodiment, the priority of the doacross process is set to be high, while the priorities of the doall process and the coarse-granularity process are set not to be high. The priority may arbitrarily determined by a designer of the application.

The number of accesses/iterations field 204 indicates the number of accesses of the cache if the process is indicated in the granularity field 202 as a coarse-granularity process or a doall process. On the other hand, the number of accesses/iterations field 204 indicates the number of iterations if the process indicated in the granularity field 202 as a doacross process. The number of accesses/iterations of each process is analyzed by a compiler.

The bus access frequency field 205 stores the frequency (access frequency) of access to the bus 101 by each process. The bus access frequency is an indicator of the frequency of cache access by the process, indicated as 1 access per number seconds. Calculation of the bus access frequency is described. The bus access frequency of a coarse-granularity process and that of a doall process are determined based on the following equation (1), while the bus access frequency of a doacross process is determined based on the following equation (2).

$$\text{Bus access frequency of coarse-granularity process or a doall process} = t[s]/(a(1-\sigma)) \text{ [number of times]} \quad (1)$$

$$\text{Bus access frequency of doacross process} = t[s]/i \text{ [number of times]} \quad (2)$$

"t" represents the execution time of a process, "a" represents the number of accesses of the cache, "σ" represents the cache hit rate, "1−σ" represents the cache miss rate, and "i" represents the number of iterations.

The access frequency of process A is 0.00005 if t=0.01 [s], the number of accesses is 2000, and σ=0.9. The access frequency of process A-1 is 0.0002 if t=0.01 [s], the number of accesses is 1000, and σ=0.95.

The access frequency of process A-1-1 is 0.0000001 if t=0.01 [s] and the number of iterations is 10000. The access frequency of process A-1-2 is 0.0001 if t=0.01 [s], the number of accesses is 1000, and σ=0.9.

The access frequency of process A-2 is 0.0001 if t=0.01 [s], the number of accesses is 1000, and σ=0.9. The access frequency of process B is 0.0001 if t=0.01 [s], the number of accesses is 1000, and σ=0.9. The access frequency of process C is 0.0001 if t=0.01 [s], the number of accesses is 1000, and σ=0.9.

Here, reference of the description returns to FIG. 1; the multicore processor system 100 includes an interface (I/F), a display, and a keyboard (not depicted). The I/F is connected to a network such as a local area network (LAN), a wide area network (WAN), and the Internet via a communication line, and to other devices through the network. The I/F administers an internal interface with the network and controls the input/output of data from/to an external device(s). For example, a modem or a LAN adapter is employed as the I/F.

The display displays a cursor, an icon(s), a tool box(es), and data such as a document, an image, and functional information. For example, a CRT display, a TFT liquid-crystal display, or a plasma display is employed as the display. The keyboard includes keys for inputting characters, numerals, various instructions, etc. and performs the input of data. Alternatively, a touch-panel-type input pad or numeric keypad, etc. can be adopted.

Figure 6:
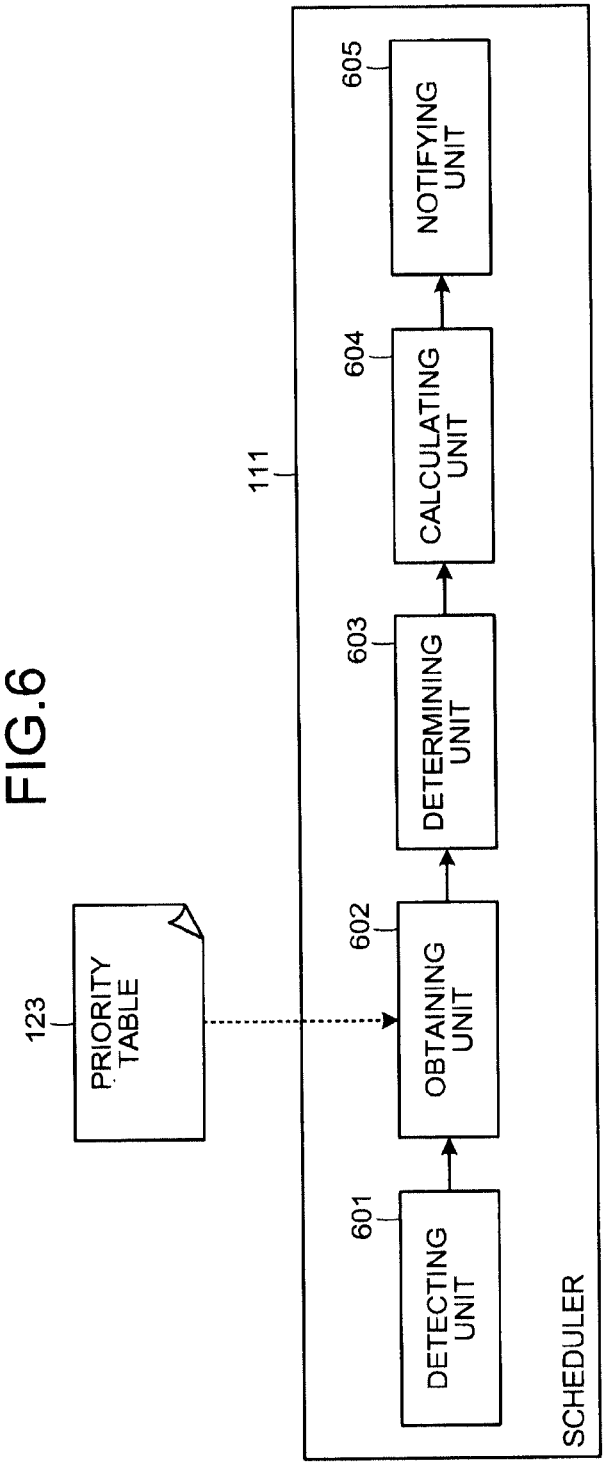
FIG. 6 is a block diagram illustrating an operation of a scheduler 111.

FIG. 6 is a block diagram illustrating an operation of the scheduler 111. For example, the scheduler 111 includes a detecting unit 601, an obtaining unit 602, a determining unit 603, a calculating unit 604, and a notifying unit 605. For example, each functional unit (i.e., the detecting unit 601 to the notifying unit 605) is implemented by CPU#0 executing the scheduler 111 stored in the shared memory 103.

The detecting unit 601 detects a change in the assignment state of the multicore processor. If a change in the assignment state is detected by the detecting unit 601, the obtaining unit 602 obtains, after the change, the number of accesses of the bus 101 by each of the processes that are assigned to the CPUs of the multicore processor.

The calculating unit 604 calculates the access ratio based on the number of accesses obtained by the obtaining unit 602. The notifying unit 605 notifies the arbitration circuit 102 of the access ratio calculated by the calculating unit 604.

For example, a change in the assignment state of the multicore processor is caused by an assignment of process, a switching of process, or a completion of process. A process performed by each functional unit upon detection of the assignment of process, the switching of process, or the completion of process is described below.

The detecting unit 601 detects an assignment of process. The obtaining unit 602 obtains the priority of the process assigned in the assignment detected by the detecting unit 601, and the priority of and the number of accesses by each of the processes after the assignment that are assigned to the CPUs.

The determining unit 603 determines, based on a given standard, whether the priority of the process assigned in the assignment is high and whether the processes assigned to the CPUs include a process having a high priority. The calculating unit 604 calculates the access ratio based on the number of accesses obtained by the obtaining unit 602 if the determining unit 603 determines the priority of the process assigned in the assignment is high or there is a process having a high priority. The notifying unit 605 notifies the arbitration circuit 102 of the access ratio calculated by the calculating unit 604.

The obtaining unit 602 also obtains the priority of the process assigned in the assignment detected by the detecting unit 601, the priority of and the number of accesses by each process assigned to the CPU and the access frequency determined based on the execution time of each process.

The determining unit 603 determines, based on a given standard, whether the priority of the process assigned in the assignment is high and whether the processes assigned to the CPUs include a process having a high priority. The calculating unit 604 calculates the access ratio based on the access frequency obtained by the obtaining unit 602 if the determining unit 603 determines the priority of the process assigned in the assignment is high or there is a process having a high priority. The notifying unit 605 notifies the arbitration circuit 102 of the access ratio calculated by the calculating unit 604.

The detecting unit 601 also detects a switching of process. The obtaining unit 602 obtains the priority of and the number of accesses by each of the processes after the switching that are assigned to the CPUs if the detecting unit 601 detects the switching.

The determining unit 603 determines, based on a given standard, whether the processes assigned to the CPUs include a process of which priority obtained by the obtaining unit 602 is high. The calculating unit 604 calculates the access ratio based on the number of accesses obtained by the obtaining unit 602 if the determining unit 603 determines the processes assigned to the CPUs include a process having a high priority. The notifying unit 605 notifies the arbitration circuit 102 of the access ratio calculated by the calculating unit 604.

The obtaining unit 602 obtains the priority of and the number of accesses by each process assigned to the CPU and the access frequency determined based on the execution time of each process if the detecting unit 601 detects the switching.

The determining unit 603 determines, based on a given standard, whether the processes assigned to the cores include a process of which priority obtained by the obtaining unit 602 is high. The calculating unit 604 calculates the access ratio based on the access frequency obtained by the obtaining unit 602 if the determining unit 603 determines the processes assigned to the cores include a process having a high priority.

The detecting unit 601 also detects the completion of process. The obtaining unit 602 obtains, after the completion, the priority of and the number of accesses by each of the processes that are assigned to the CPUs if the detecting unit 601 detects the completion. The determining unit 603 determines, based on a given standard, whether the processes assigned to the CPUs include a process of which priority obtained by the obtaining unit 602 is high.

The calculating unit 604 calculates the access ratio based on the number of accesses obtained by the obtaining unit 602 if the determining unit 603 determines the processes include a process having a high priority. The notifying unit 605 notifies the arbitration circuit 102 of the access ratio calculated by the calculating unit 604.

The obtaining unit 602 obtains the priority of and the number of accesses by each process assigned to the CPU and the access frequency determined based on the execution time of each process if the detecting unit 601 detects the completion. The determining unit 603 determines, based on a given standard, whether the processes assigned to the cores include a process of which priority obtained by the obtaining unit 602 is high.

The calculating unit 604 calculates the access ratio based on the access frequency obtained by the obtaining unit 602 if the determining unit 603 determines the processes include a process having a high priority. The notifying unit 605 notifies the arbitration circuit 102 of the access ratio calculated by the calculating unit 604.

Taking the above description into account, detailed description is provided below with reference to the drawings.

Figure 7:
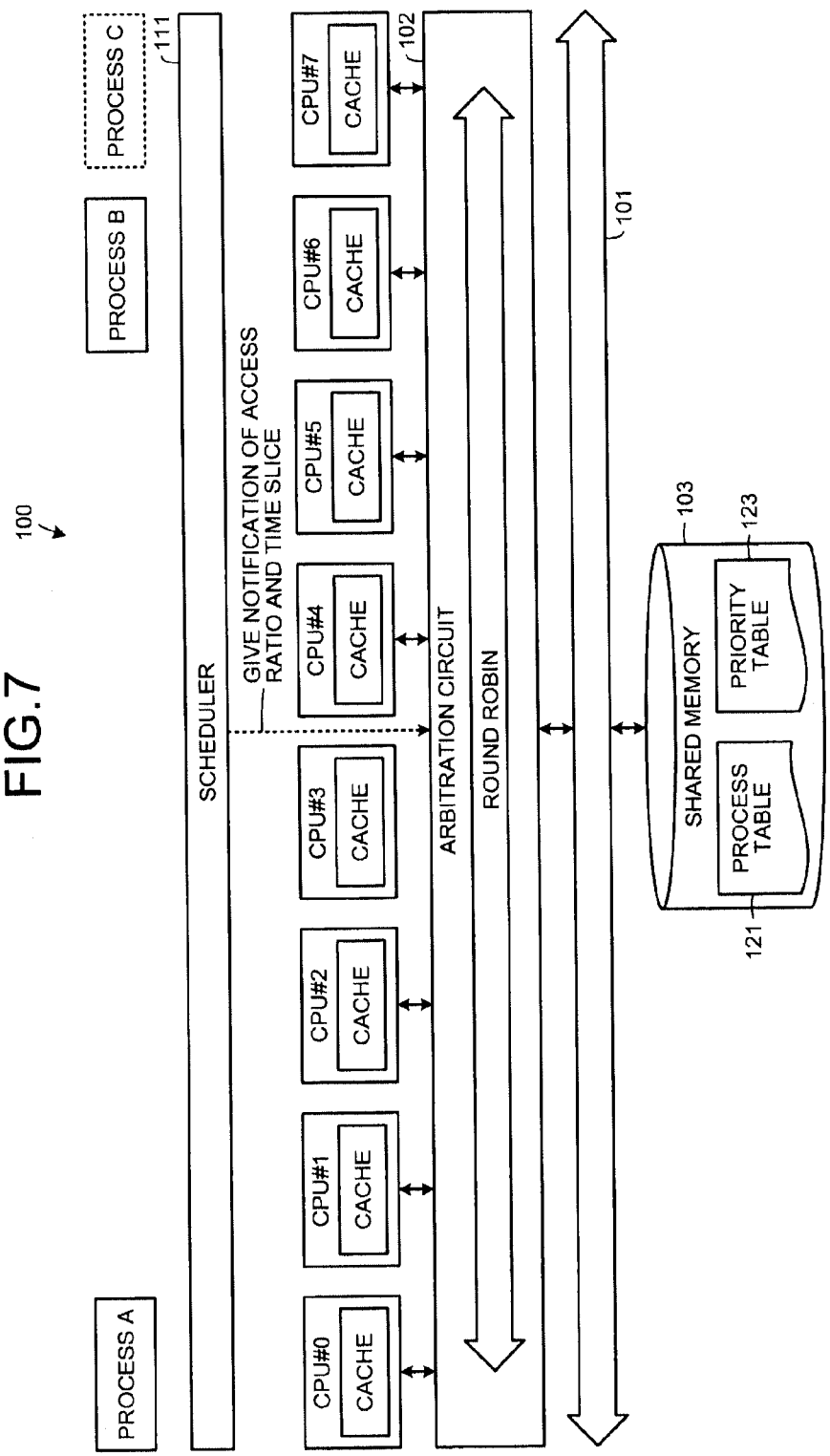
FIG. 7 is a diagram of a first example of assignment of processes.

FIG. 7 is a diagram of a first example of assignment of processes. Process A is assigned to CPU#0 and process B is assigned to CPU#6. The scheduler 111 detects a task dispatch of process C to CPU#7.

Upon detection of the task dispatch, the scheduler 111 obtains the priority of process C from the priority table 123, and determines whether the priority of process C is high. Here, the priority of process C is determined not to be high. In this case, the scheduler 111 determines the access ratio of CPUs as 1:1. In other words, the scheduler 111 causes the arbitration circuit 102 to control accesses of the bus 101 by the CPUs according to round robin.

The scheduler 111 identifies processes assigned to the CPUs, and obtains the number of accesses/iterations of each of the identified processes and the number of accesses by process C from the priority table 123. Here, process A and process B are identified. The number of accesses by process A is 2000, the number of accesses by process B is 1000, and the number of accesses by process C is 1000. The scheduler 111 calculates the time slice according to the following equation (3).

Time slice=given period of time [ms]/total of number of accesses [number of times]   (3)

The scheduler 111 calculates the time slice by calculating the total of the number of accesses and dividing a given period of time by the calculated total. In the present embodiment, the given period of time is 0.1 [ms]. Thus, the time slice is calculated as follows.

Time slice=0.1/(2000+1000+1000)=0.000025

The scheduler 111 notifies the arbitration circuit 102 of the determined access ratio and the calculated time slice.

Figure 8:
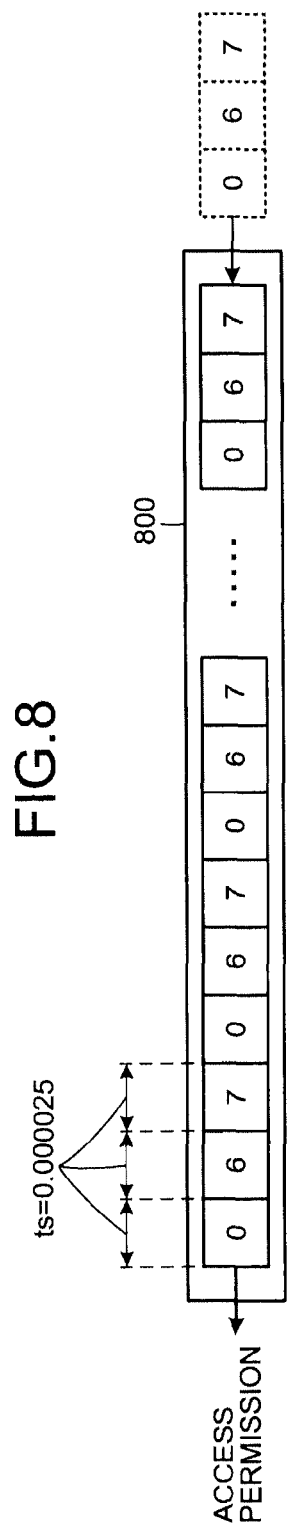
FIG. 8 is a diagram of a first example of arbitrating accesses based on a notified access ratio.

FIG. 8 is a diagram of a first example of arbitrating accesses based on the notified access ratio. In the example of FIG. 8, access requests from the CPUs (indicated by square in the figure, and the number in the square corresponds to the number of each CPU) are alternately registered into a request buffer 800 since the access ratio is 1:1. Accesses are permitted sequentially from the top of the request buffer 800. ts is the time slice, and is 0.000025.

Figure 9:
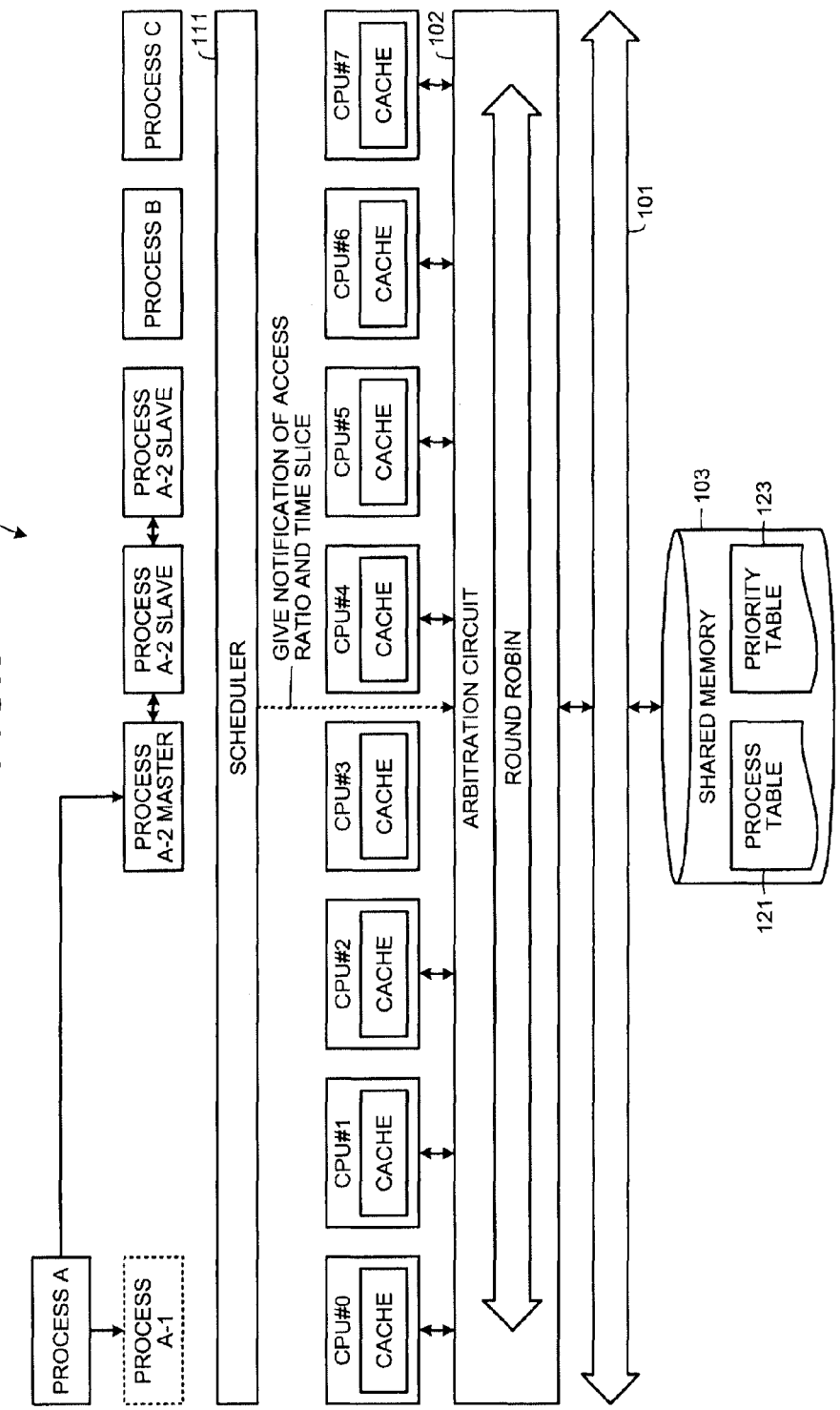
FIG. 9 is a diagram of a second example of assignment of processes.

FIG. 9 is a diagram of a second example of assignment of processes. Process A-2 master is assigned to CPU#3, process A-2 slave is assigned to CPU#4, process A-2 slave is assigned to CPU#5, process B is assigned to CPU#6, and process C is assigned to CPU#7.

It is assumed a task switch from process A to process A-1 occurs on CPU#0 to which process A has been assigned. The scheduler 111 detects the task switch and identifies processes assigned to the CPUs, namely, process A-1, process A-2 master, two process A-2 slaves, process B, and process C. As described above, the scheduler 111 detects a task switch or a task completion by referring to the process table 121.

The scheduler 111 obtains the priority of each of the identified processes from the priority table 123, and determines whether the identified processes include a process having a high priority. The scheduler 111 determines the identified processes include no process having a high priority since the priorities of process A-1, process A-2 master, two process A-2 slaves, process B, and process C are not high.

The scheduler 111 determines the access ratio of CPUs as 1:1 if the assigned processes include no process having a high priority. In other words, the scheduler 111 causes the arbitration circuit 102 to control accesses of the bus 101 by the CPUs according to round robin.

The scheduler 111 obtains the number of accesses/iterations of each of the identified processes from the priority table 123. Here, process A and process B are identified. The number of accesses by process A-1 is 1000, the number of accesses by process A-2 is 1000, the number of accesses by process B is 1000, and the number of accesses by process C is 1000. The scheduler 111 calculates the time slice according to the above equation (3). Thus, the time slice is calculated as follows.

Time slice=0.1/(1000+1000+1000+1000)=0.000025

The scheduler 111 notifies the arbitration circuit 102 of the determined access ratio and the calculated time slice.

Figure 10:
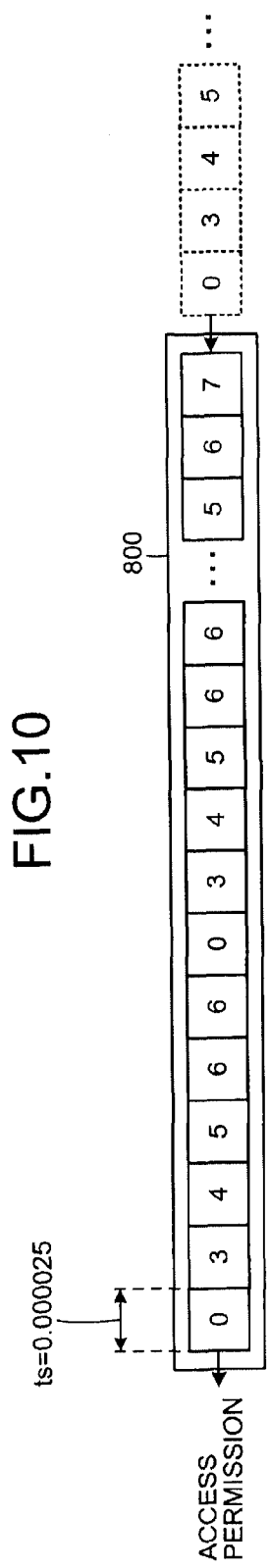
FIG. 10 is a diagram of a second example of arbitrating accesses based on the notified access ratio.

FIG. 10 is a diagram of a second example of arbitrating accesses based on the notified access ratio. In the example of FIG. 10, access requests from the CPUs (indicated by square in the figure, and the number in the square corresponds to the number of each CPU) are alternately registered into the request buffer 800 since the access ratio is 1:1. Accesses are permitted sequentially from the top of the request buffer 800. ts is the time slice, and is 0.000025.

Figure 11:
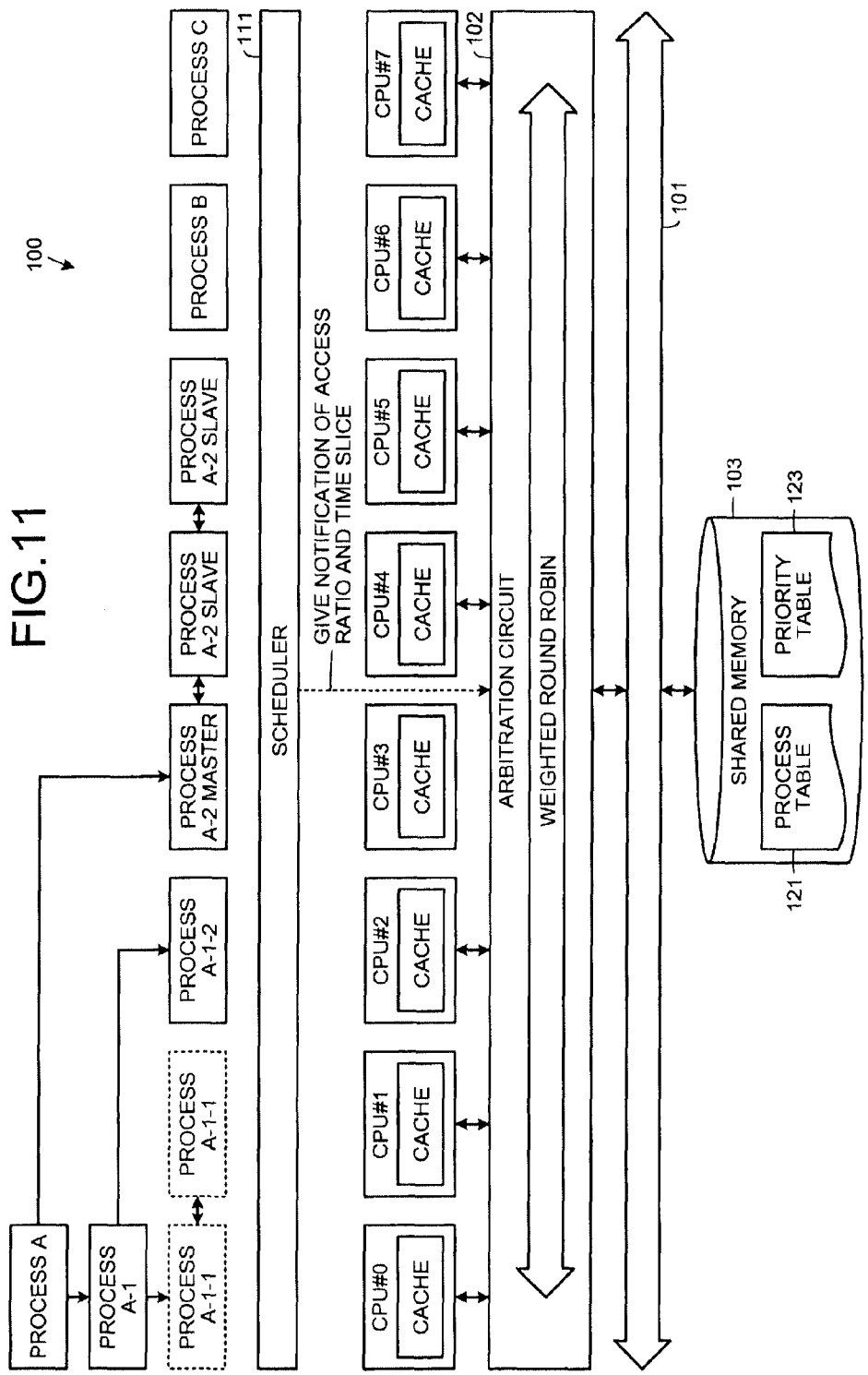
FIG. 11 is a diagram of a third example of assignment of processes.

FIG. 11 is a diagram of a third example of assignment of processes. Process A-1-2 is assigned to CPU#2, process A-2 master is assigned to CPU#3, process A-2 slave is assigned to CPU#4, process A-2 slave is assigned to CPU#5, process B is assigned to CPU#6, and process C is assigned to CPU#7.

It is assumed a task switch from process A-1 to process A-1-1 occurs on CPU#0 to which process A-1 has been assigned, and a task dispatch of process A-1-1 slave to CPU#1 occurs. The scheduler 111 detects the task dispatch subsequent to the task switching.

Upon detection of the task dispatch, the scheduler 111 obtains the priority of process A-1-1 slave assigned by the task dispatch from the priority table 123, and determines whether the priority of A-1-1 slave is high based on the priority table 123. Here, the priority of A-1-1 slave is determined to be high since the priority of A-1-1 is high.

In this case, the scheduler 111 calculates the access ratio according to the number of accesses. For example, the access ratio may be calculated based on the number of accesses, or based on the access frequency calculated based on the number of accesses. An example of calculating the access ratio based on the number of accesses is described. The scheduler 111 obtains the number of accesses/iterations of each of the processes assigned to the CPUs from the priority table 123.

The number of accesses by process A-1-1 is 10000, the number of accesses by process A-1-2 is 1000, the number of accesses by process A-2 is 1000, the number of accesses by process B is 1000, and the number of accesses by process C is 1000. The scheduler 111 identifies the number of CPUs to which doacross processes are assigned, and calculates the access ratio as follows.

CPU#0:CPU#1:CPU#2:CPU#3:CPU#4:CPU#5:CPU#6: CPU#7 =number of accesses by process A-1-1/2:number of accesses by process A-1-1/2:number of accesses by process A-1-2:number of accesses by process A-2:number of accesses by process A-2:number of accesses by process B:number of accesses by process C =5000:5000:1000:1000: 1000:1000:1000:1000 =5:5:1:1:1:1:1:1

The value for a CPU to which a doacross process is assigned is calculated based on the number of iterations/the number of CPUs to which doacross processes are assigned.

Although the value for a CPU to which a doall process is assigned is calculated based on the number of accesses in the above example, the value may be the number of accesses/the number of CPUs to which doall processes are assigned.

An example of calculating the access ratio based on the access frequency is described. The access frequency is an indicator of the frequency of cache access by the process, indicated as 1 access per number seconds. The scheduler 111 obtains the access frequency of each of the processes assigned to CPUs from the priority table 123, and determines the access ratio according to the access frequency.

The access frequency of process A-1-1 is $10^{-6}$ [s/number of times], the access frequency of process A-1-2 is $10^{-4}$, the access frequency of process A-2 is $10^{-4}$, the access frequency of process B is $10^{-4}$, and the access frequency of process C is $10^{-4}$. "^" represents an exponent, and "$10^{-6}$" represents 10 to the minus 6th power. Process A-1-1 accesses the cache 100 times more frequently than the other processes assigned to the CPUs, and is divided into two processes.

The scheduler 111 calculates the access ratio of processes based on the access frequency as follows.

Process A-1-1:process A-1-2:process A-2:process B:process C=100:1:1:1:1

The scheduler 111 identifies the number of CPUs to which doacross processes are assigned. Here, process A-1-1 is assigned to two CPUs. The scheduler 111 determines the access ratio as follows.

CPU#0:CPU#1:CPU#2:CPU#3:CPU#4:CPU#5:CPU#6: CPU#7 =value for process A-1-1/2:value for process A-1-1/2:value for process A-1-2:value for process A-2:value for process A-2:value for process A-2:value for process B:value for process C =50:50:1:1:1:1:1:1

Process A-1-1 accesses the cache 100 times per time period of 0.1 [ms] since the execution time and the number of iterations is 10000. Thus, CPUs #0 and #1 to which process A-1-1 is assigned access the bus 101 50 times per the time period of 0.1 [ms], respectively, since process A-1-1 is divided into two.

On the other hand, process A-1-2 accesses the cache once per the time period of 0.1 [ms] since t=0.01 [s] and the number of accesses is 1000. Thus, CPU#2 to which process A-1-2 is assigned accesses the bus 101 once per the time period of 0.1 [ms].

The difference between the number of accesses of process A-1-1 and that of process A-1-2 is only 10-fold. However, process A-1-1 accesses the cache 100 times more frequently than process A-1-2 during a given time period, since the execution time is the same. Thus, an optimal access ratio can be determined according to the execution time and the number of accesses by calculating a relative access ratio according to the access frequency. The scheduler 111 calculates the time slice according to the above equation (3) as follows.

Time slice=0.1/(1000+1000+1000+1000)=0.000025

The scheduler 111 notifies the arbitration circuit 102 of the calculated access ratio and the time slice.

FIG. 12 is a diagram of a third example of arbitrating accesses based on the notified access ratio. FIG. 12 illustrates an example of notifying the arbitration circuit 102 of the access ratio calculated based on the access frequency. Here, the arbitration circuit 102 arbitrates accesses according to a weighted round robin. An access request from CPU#0 or #1 is temporarily suspended when the time slice of the access request has elapsed, and input into the end of the request buffer 800 only once per 50 times (i.e., the number of accesses per unit of time) and is otherwise input into the top of the request buffer 800.

In other words, one access request from any one of CPUs #2 to #7 is registered into the request buffer 800 when 50 access requests from CPU#0 or #1 are registered.

Conventionally, CPU#0 to which a doacross process is assigned has to wait for access to the bus 101 78 times per 0.1 [ms] since the access ratios are 1:1. On the other hand, according to the third example, CPU#0 to which a doacross process is assigned waits for access to the bus 101 6 times per 0.1 [ms], thereby reducing the wait time for the right to access the bus and reducing the execution time.

In the present embodiment, although the access frequency is an indicator of the frequency of cache access by the process in terms of 1 access per number seconds, the access frequency may be an indicator of the number of times that the process accesses the cache during a given time period.

In the present embodiment, the priority of each of the processes assigned to the CPUs may be obtained after the detected change in the assignment state, and the access ratio may be determined based on the number of accesses if a process having a high priority is assigned.

FIG. 13 is a flowchart of a control performed by the scheduler 111. Here, an example of calculating the access ratio based on the access frequency is described. The scheduler 111 determines whether a change in the assignment state of the multicore processor is detected (step S1301). If not (step S1301: NO), the process returns to step S1301.

On the other hand, if the scheduler 111 detects a task dispatch (step S1301: TASK DISPATCH), the scheduler 111 obtains the priority of the dispatched process (step S1302) and determines whether the priority is high (step S1303). If the scheduler 111 determines the priority is not high (step S1303: NO), the process transitions to step S1304.

On the other hand, if the scheduler 111 detects a task switch or a task completion (step S1301: TASK SWITCH or TASK COMPLETION), the process transitions to step S1304. The scheduler 111 obtains the priority of each of the processes assigned to the CPUs (step S1304), and determines whether a process having a high priority is under execution based on the obtained priorities (step S1305). Here, a process assigned to any one of the CPUs is the process being executed by the CPU.

If the scheduler 111 determines no process having a high priority is under execution (step S1305: NO), the scheduler 111 determines the values constituting the access ratio to be the same (step S1306), and the process transitions to step S1309. In other words, the scheduler 111 controls the arbitration circuit 102 to arbitrate accesses from the CPUs according to round robin.

If the scheduler 111 determines the obtained priority is high (step S1303: YES) or a process having a high priority is under execution (step S1305: YES), the scheduler 111 obtains the access frequency of each of the processes assigned to the CPUs (step S1307), and calculates the access ratio of CPUs based on the access frequency (step S1308), and the process transitions to step S1309.

Subsequent to step S1306 or S1308, the scheduler 111 obtains the number of accesses by each of the processes assigned to the CPUs (step S1309), calculates the total of the number of accesses by each of the processes assigned to the CPUs (step S1310), and calculates the time slice=unit of time/total (step S1311). The scheduler 111 notifies the arbitration circuit 102 of the access ratio and the time slice (step S1312), and the process returns to step S1301.

As described above, if the assignment state of the cores has changed, the multicore processor system, the control program, and the control method calculate the access ratio based on the number of accesses by each of the processes after the change that are assigned to the cores. In other words, an optimal access ratio is determined according to the combination of processes under execution, thereby reducing the wait time of a process that accesses the bus frequently, and reducing the execution time of the process.

Further, the access ratio is calculated based on the number of accesses by each of the processes assigned to the CPUs, if an assignment of process is detected and the process assigned in the assignment has a high priority. Thus, the wait time of a process that has a high priority and accesses the bus frequently is reduced, thereby accelerating the process performed by the CPU to which the process is assigned, and improving the throughput.

Further, the access ratio is calculated based on the number of accesses by each of the processes assigned to the CPUs, if an assignment of process is detected and the process assigned in the assignment has a high priority or a process having a high priority is under execution. Thus, the wait time of a process that has a high priority and accesses the bus frequently is reduced, thereby accelerating the process performed by the CPU to which the process is assigned, and improving the throughput.

Further, the access ratio is calculated based on the number of accesses by each process if a switching of process is detected and a process having a high priority is under execution even after the switching. Thus, the wait time of a process that accesses the bus frequently is reduced, thereby accelerating the process performed by the CPU to which the process is assigned, and improving the throughput.

Further, the access ratio is calculated based on the number of accesses by each process if the completion of process is detected and a process having a high priority is under execution even after the completion of the process. Thus, the wait time of a process that accesses the bus frequently is reduced, thereby accelerating the process performed by the CPU to which the process is assigned, and improving the throughput.

Further, a relative access ratio is calculated based on the access frequency, thereby reducing the wait time of a process that accesses the bus frequently during a given time period.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A multicore processor system comprising a core configured to:
   detect a change in a state of assignment of a multicore processor;
   obtain, upon detecting the change in the state of assignment, a number of accesses by processes, assigned to cores of the multicore processor, of a common resource shared by the multicore processor;
   calculate an access ratio based on the obtained number of accesses; and
   notify an arbitration circuit of the calculated access ratio, the arbitration circuit arbitrating accesses of the common resource by the multicore processor.

2. The multicore processor system according to claim 1, the core further configured to determine whether a priority is high based on a given standard, wherein
   the core detects an assignment of a process,
   the core obtains the priority of the process assigned in the detected assignment, and after the assignment, obtains the number of accesses by the processes assigned to the cores,
   the core determines whether the priority of the process assigned in the assignment is high based on the given standard, and
   the core, upon determining that the priority of the process assigned in the assignment is high, calculates the access ratio based on the obtained number of accesses.

3. The multicore processor system according to claim 2, wherein
   the core obtains the priority of the process assigned in the assignment, the number of accesses by the processes, and an access frequency determined based on an execution time of the processes,
   the core determines whether the priority of the process assigned in the assignment is high based on the given standard, and
   the core, upon determining that the priority of the process assigned in the assignment is high, calculates the access ratio based on the obtained access frequency.

4. The multicore processor system according to claim 2, wherein
   the core obtains the priority of the process assigned in the detected assignment, the priority of and the number of accesses by the processes, and an access frequency determined based on an execution time of the processes,
   the core determines whether the priority of the process assigned in the assignment is high based on the given standard, and upon determining that the priority of the process assigned in the assignment is not high, determines, whether the processes assigned to the cores include a process of which the obtained priority is high based on the given standard, and
   the core, upon determining that the processes assigned to the cores include a process of which the obtained priority is high, calculates the access ratio based on the obtained access frequency.

5. The multicore processor system according to claim 1, the core further configured to determine whether a priority is high based on a given standard, wherein
   the core detects an assignment of a process,
   the core obtains the priority of the process assigned in the detected assignment, and after the assignment, obtains the priority of and the number of accesses by the processes assigned to the cores,
   the core determines whether the priority of the process assigned in the assignment is high based on the given standard, and upon determining that the priority of the process assigned in the assignment is not high, determines whether the processes assigned to the cores include a process of which the obtained priority is high based on the given standard, and
   the core, upon determining that the processes assigned to the cores include a process having a high priority, calculates the access ratio based on the obtained number of accesses.

6. The multicore processor system according to claim 1, the core further configured to determine whether a priority is high based on a given standard, wherein the core detects a switching of a process, the core obtains, upon detecting the switching, the priority of and the number of accesses by the processes that are assigned to the cores, the core determines whether the processes assigned to the cores include a process of which the obtained priority is high based on the given standard, and the core, upon determining that the processes assigned to the cores include a process having a high priority, calculates the access ratio based on the obtained number of accesses.

7. The multicore processor system according to claim 6, wherein the core obtains, upon detecting the switching, the priority of and the number of accesses by the processes assigned to the cores, and an access frequency determined based on an execution time of the processes, the core determines whether the processes assigned to the cores include a process of which the obtained priority is high based on the given standard, and the core, upon determining that the processes assigned to the cores include a process having a high priority, calculates the access ratio based on the obtained access frequency.

8. The multicore processor system according to claim 1, wherein the core detects a completion of a process, the core obtains, upon detecting the completion, the priority of and the number of accesses by the processes that are assigned to the cores, the core determines whether the processes assigned to the cores include a process of which the obtained priority is high based on the given standard, and the core, upon determining that the processes include a process having a high priority, calculates the access ratio based on the obtained number of accesses.

9. The multicore processor system according to claim 8, wherein the core obtains, upon detecting the completion, the priority of and the number of accesses by the processes, and an access frequency determined based on an execution time of each of the processes, the core determines whether the processes assigned to the cores include a process of which the obtained priority is high based on the given standard, and the core, upon determining that the processes include a process having a high priority, calculates the access ratio based on the obtained access frequency.

10. A computer-readable non-transitory recording medium storing a control program causing a core of a multicore processor to execute a process comprising:

detecting a change in a state of assignment of the multicore processor;

obtaining, when the change in the state of assignment is detected at the detecting, a number of accesses by processes, assigned to cores of the multicore processor, of a common resource shared by the multicore processor;

calculating an access ratio based on the number of accesses obtained at the obtaining; and notifying an arbitration circuit of the access ratio calculated at the calculating, the arbitration circuit arbitrating accesses of the common resource by the multicore processor.

11. A control method executed by a core of a multicore processor, the method comprising:

detecting a change in a state of assignment of the multicore processor;

obtaining, when the change in the state of assignment is detected at the detecting, a number of accesses by processes, assigned to cores of the multicore processor, of a common resource shared by the multicore processor;

calculating an access ratio based on the number of accesses obtained at the obtaining; and notifying an arbitration circuit of the access ratio calculated at the calculating, the arbitration circuit arbitrating accesses of the common resource by the multicore processor.

\* \* \* \* \*

UNITED STATES PATENT AND TRADEMARK OFFICE
CERTIFICATE OF CORRECTION

| | |
|---|---|
| PATENT NO. | : 9,141,429 B2 |
| APPLICATION NO. | : 13/624353 |
| DATED | : September 22, 2015 |
| INVENTOR(S) | : Hiromasa Yamauchi et al. |

Page 1 of 1

It is certified that error appears in the above-identified patent and that said Letters Patent is hereby corrected as shown below:

On the Title Page, (72) Inventors, Line 1

Delete "(JE);" and insert --(JP);--, therefor.

Signed and Sealed this
Eighth Day of December, 2015

Michelle K. Lee
*Director of the United States Patent and Trademark Office*